United States Patent
Wang et al.

(10) Patent No.: US 10,433,669 B2
(45) Date of Patent: Oct. 8, 2019

(54) BEAN GRINDER AND AUTOMATIC COFFEE POT EQUIPPED WITH THE SAME

(71) Applicant: Vesta Electrical Appliance Manufacturing (Zhongshan) Co., Ltd., Zhuhai, Guangdong Province (CN)

(72) Inventors: Donglei Wang, Zhuhai (CN); Xuejun Chen, Zhuhai (CN); Xiaolin Chen, Zhuhai (CN); Dongping Lai, Zhuhai (CN)

(73) Assignee: Vesta Electrical Appliance Manufacturing (Zhongshan) Co., Ltd. (CN)

( * ) Notice: Subject to any disclaimer, the term of this patent is extended or adjusted under 35 U.S.C. 154(b) by 392 days.

(21) Appl. No.: 15/342,955

(22) Filed: Nov. 3, 2016

(65) Prior Publication Data
US 2017/0181568 A1    Jun. 29, 2017

(30) Foreign Application Priority Data
Dec. 24, 2015    (CN) .......................... 2015 1 0996257

(51) Int. Cl.
| | |
|---|---|
| *A47J 31/42* | (2006.01) |
| *A47J 42/06* | (2006.01) |
| *A47J 42/10* | (2006.01) |
| *A47J 42/40* | (2006.01) |

(52) U.S. Cl.
CPC ............ *A47J 31/42* (2013.01); *A47J 42/06* (2013.01); *A47J 42/10* (2013.01); *A47J 42/40* (2013.01)

(58) Field of Classification Search
CPC .. A47J 31/42; A47J 42/06; A47J 42/10; A47J 42/26; A47J 42/40

USPC ............................ 99/286; 241/250, 260, 277
See application file for complete search history.

(56) References Cited

U.S. PATENT DOCUMENTS

| | | | | | |
|---|---|---|---|---|---|
| 9,032,866 | B2 * | 5/2015 | White | ..................... | A47J 31/04 |
| | | | | | 99/280 |
| 2011/0283889 | A1 * | 11/2011 | Con | ........................ | A47J 31/42 |
| | | | | | 99/286 |

FOREIGN PATENT DOCUMENTS

| | | | | | |
|---|---|---|---|---|---|
| CA | 2885945 A1 | * | 3/2014 | .............. | A47J 31/42 |
| CA | 2839899 A1 | * | 8/2014 | .............. | A47J 42/06 |
| DE | 1257377 A1 | * | 12/1967 | .............. | A47J 31/42 |
| EP | 1818099 A1 | * | 8/2007 | .............. | A47J 42/06 |
| EP | 2050377 A1 | * | 4/2009 | .............. | A47J 42/06 |

(Continued)

*Primary Examiner* — Reginald Alexander
(74) *Attorney, Agent, or Firm* — Carstens & Cahoon, LLP; Colin P. Cahoon; Samie S. Leigh

(57) ABSTRACT

A bean grinder having a bean grinding chamber part, a dynamic grinding wheel, a static grinding wheel, and a residue removing plate. The bean grinding chamber part comprises a bean grinding chamber and a powder discharge channel. An inner wall of the bean grinding chamber is provided with a planar first inner wall disposed close to a powder discharge port and located at a rear side of the powder discharge port in a rotation direction of the dynamic grinding wheel. The first inner wall is tangent to a circle of the inner wall of the bean grinding chamber. An inner wall of the powder discharge channel comprises a second inner wall located at the side of the powder discharge port provided with the first inner wall, and the second inner wall is inclined outwards at a given angle α with respect to the first inner wall.

14 Claims, 5 Drawing Sheets

(56) References Cited

FOREIGN PATENT DOCUMENTS

GB 454685 * 7/1935 .............. A47J 31/42

* cited by examiner

BEAN GRINDER AND AUTOMATIC COFFEE POT EQUIPPED WITH THE SAME

CROSS-REFERENCE TO RELATED APPLICATIONS

This application claims all benefits accruing under 35 U.S.C. § 119 from China Patent Application No. 201510996257.1, filed on Dec. 24, 2015 in the China Intellectual Property Office, the content of which is hereby incorporated by reference.

TECHNICAL FIELD

The present invention relates to kitchen utensils, and more specifically, relates to a bean grinder and an automatic coffee pot equipped with the same.

BACKGROUND

As is well known, an automatic coffee pot equipped with a bean grinder generally has difficulties in cleaning and treating of blocking coffee powder. In general, there are several ways of solving the problems. In one case, the bean grinder is fixed to a body of coffee maker by means of fasteners such that it cannot be detached easily by users. When the bean grinder is blocked by coffee powder or the bean grinder needs to be cleaned, the whole equipment has to be disassembled in most cases, which would adversely affect the user's experience while using the automatic coffee pot equipped with the bean grinder. In another case, an opening is provided at the upper part of a powder discharge channel such that when the bean grinder is blocked by coffee powder, the blocking coffee powder can be removed from the opening, however, the partial opening at the starting portion of the powder discharge channel is hard to be cleaned. In this situation, the powder discharge channel has to be enlarged in order to clean the bean grinder smoothly, which would increase the amount of remaining coffee powder and reduce the taste of boiled coffee. There is another way of solving the problems by arranging a powder discharge channel at the bottom of a bean grinding chamber, it is alleged that no clean-up is required because coffee powder drops directly by gravity. However, it still has the problem of blocking powder which remains at the opening at the starting portion of the powder discharge channel, and it is still difficult to clean up the blocking powder.

SUMMARY

In view of the defects existing in prior art mentioned above, a technical problem to be solved by the present invention is to provide a bean grinder, which is easy to be cleaned up and allows little coffee powder to remain after grinding, and an automatic coffee pot equipped with the bean grinder.

In order to solve the above-mentioned technical problem, the present invention provides a bean grinder, comprising a bean grinding chamber part, a dynamic grinding wheel, a static grinding wheel, and a residue removing plate, wherein the bean grinding chamber part comprises a bean grinding chamber and a powder discharge channel, a powder discharge port is defined on an inner wall of the bean grinding chamber, the powder discharge channel is located at one side of the bean grinding chamber, and the leading end of the powder discharge channel is in connection with the powder discharge port; the dynamic grinding wheel and the residue removing plate are installed in order, from top to bottom, to a rotor shaft disposed in the bean grinding chamber; the static grinding wheel is fixed in the bean grinding chamber and engaged with the dynamic grinding wheel; the inner wall of the bean grinding chamber is provided with a first inner wall that is planar, the first inner wall is disposed close to the powder discharge port and located at a rear side of the powder discharge port in a rotation direction of the dynamic grinding wheel, and the first inner wall is tangent to a circle (O) of the inner wall of said bean grinding chamber; an inner wall of the powder discharge channel comprises a second inner wall located at a same side of the powder discharge port with the first inner wall, and the second inner wall is inclined outwards at a given angle α with respect to the first inner wall, 0°<α<180°.

In one embodiment, 10°≤α≤90°.

In one embodiment, a width of the powder discharge port is 10 cm-20 cm.

In one embodiment, the first inner wall and the second inner wall are connected in a manner of circular arc transition.

In one embodiment, the powder discharge channel includes a primary channel adjacent to the powder discharge port, and a secondary channel distant from the powder discharge port, a width of the primary channel is smaller than a width of the secondary channel, and a stepped surface is formed between the primary channel and the secondary channel.

In one embodiment, the inner wall of the powder discharge channel includes a third inner wall opposite to the second inner wall, and the stepped surface is located at the third inner wall.

In one embodiment, the height of the stepped surface is 2 cm-10 cm.

In one embodiment, the top inner wall of the powder discharge channel is arc-shaped.

In one embodiment, an opening is defined at the top of the powder discharge channel, the opening is provided with a powder slot cover, and an inner surface of the powder slot cover is arc-shaped.

The present invention provides an automatic coffee pot, which comprises the bean grinder.

The bean grinder of the present invention has the first inner wall tangent to the circle of the inner wall of the bean grinding chamber such that coffee powder accumulating at the powder discharge port can be reduced, and powder discharge can be facilitated. Moreover, the second inner wall is inclined outwards at a given angle α with respect to the first inner wall, which results in the blocking force of coffee powder accumulated near to the second inner wall smaller than the centrifugal pushing force generated by the rotation of the residue removing plate. As such, the blocking coffee powder can be pushed out by the centrifugal pushing force generated by the rotation of the residue removing plate. As a result, the requirements of consumers for a easy clean-up, easy maintenance automatic coffee pot equipped with a bean grinder can be satisfied.

Advantageous effects provided by additional technical features of the present invention will be illustrated in the Detailed Description of Disclosed Embodiments.

The elements in the diagrams are denoted as follows:
10—bean grinding chamber part;
11—bean grinding chamber;
12—inner wall of bean grinding chamber;
12a—first inner wall;
13—powder discharge port;
14—powder discharge channel;
141—primary channel;
142—secondary channel;
14a—second inner wall;
14b—third inner wall;
14c—stepped surface;
14d—opening;
15—bottom of bean grinding chamber;
15a—shaft hole;
20—static grinding wheel;
30—dynamic grinding wheel;
40—residue removing plate;
50—rotor shaft;
60—powder slot cover;
70—driving device.

DETAILED DESCRIPTION OF DISCLOSED EMBODIMENTS

The present invention will be illustrated in detail with reference to the accompanying drawings and embodiments. It should be understood that various embodiments and the features thereof can be combined mutually under the condition of no conflict.

Figure 1:
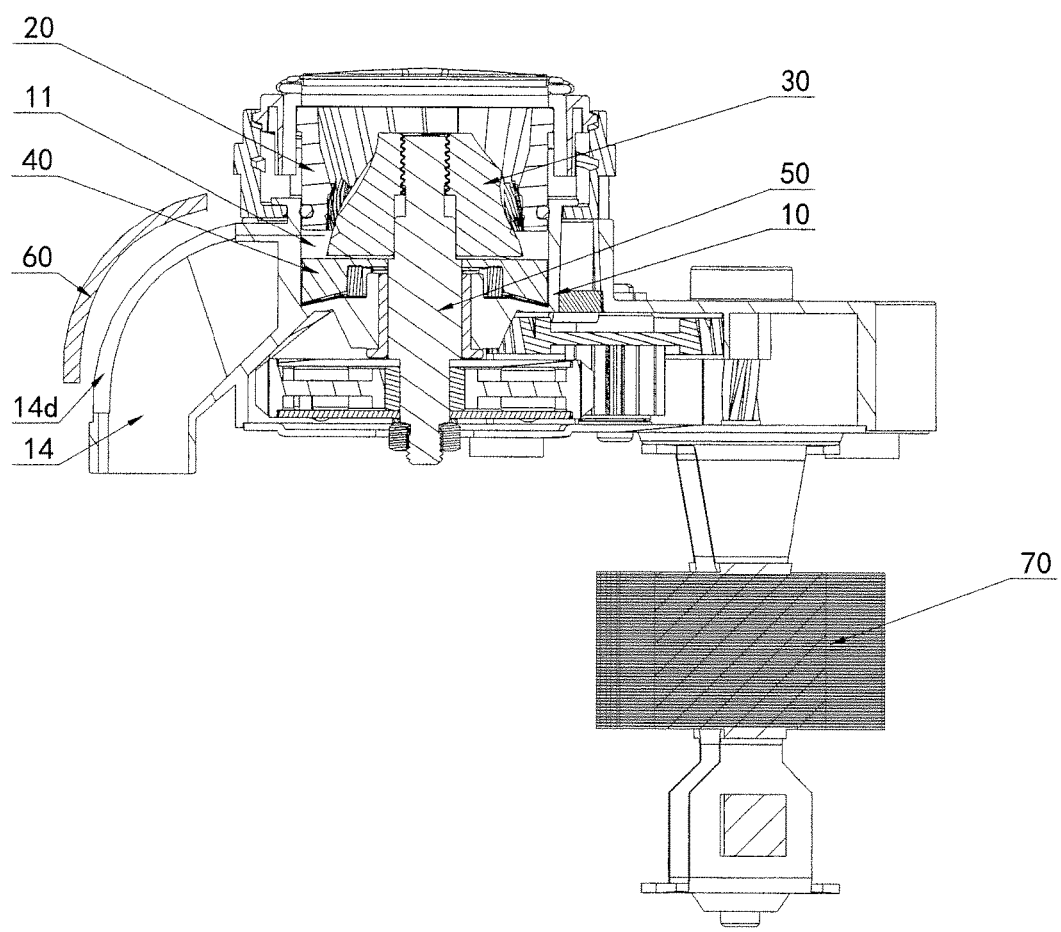
FIG. 1 is a longitudinal cross section view of one embodiment of a bean grinder of the present invention.
Figure 2:
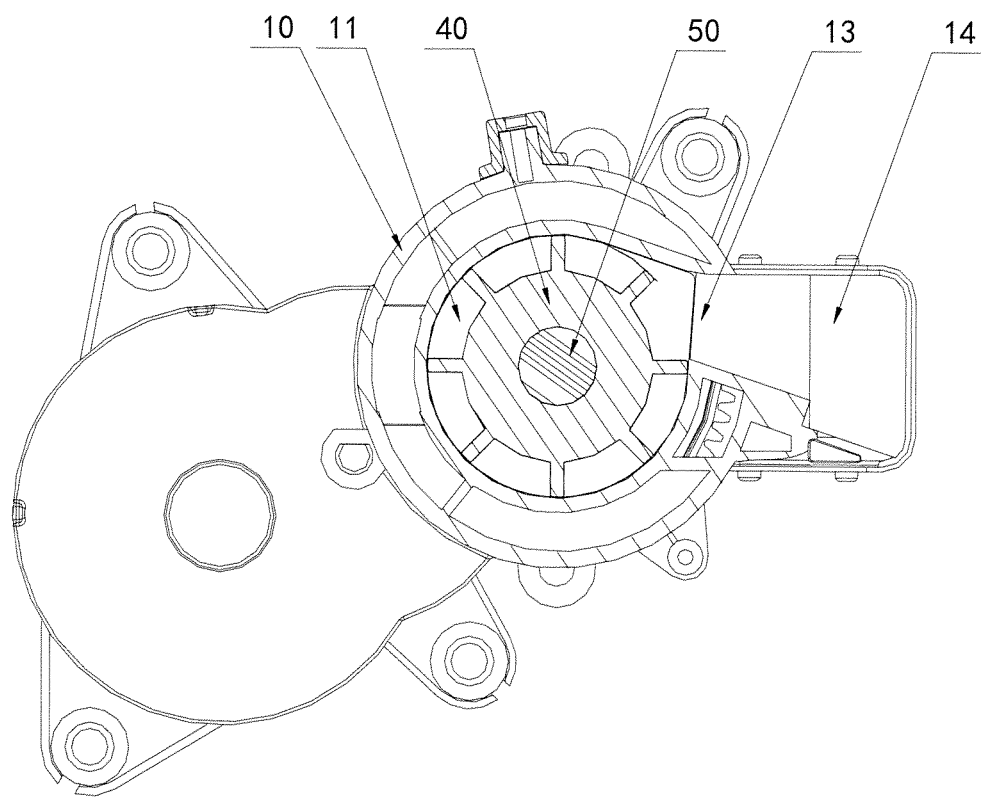
FIG. 2 is a latitudinal cross section view of one embodiment of the bean grinder of the present invention.

Referring to FIG. 1 and FIG. 2, according to one embodiment of the present invention, a bean grinder comprises a bean grinding chamber part 10, a rotor shaft 50, a dynamic grinding wheel 30, a static grinding wheel 20, a residue removing plate 40, and a driving device 70.

Figure 3:
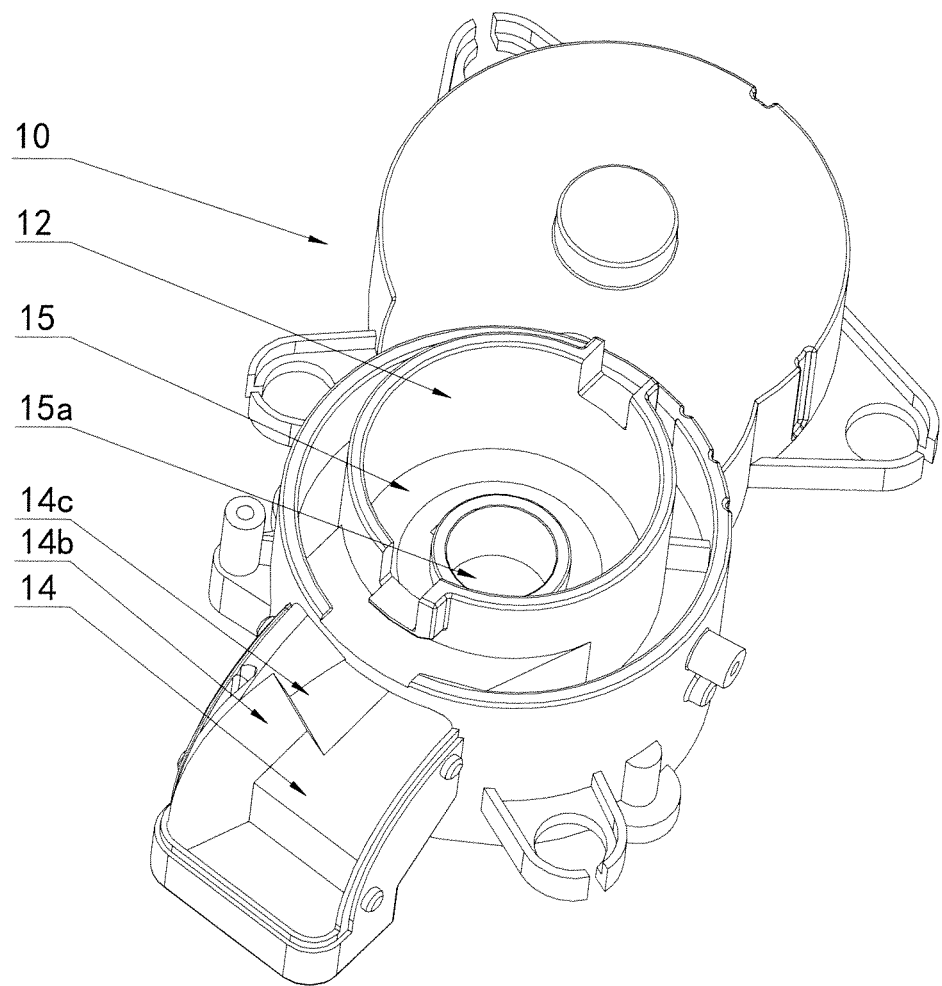
FIG. 3 is a perspective view of one embodiment of a bean grinding chamber part of the bean grinder of the present invention.
Figure 4:
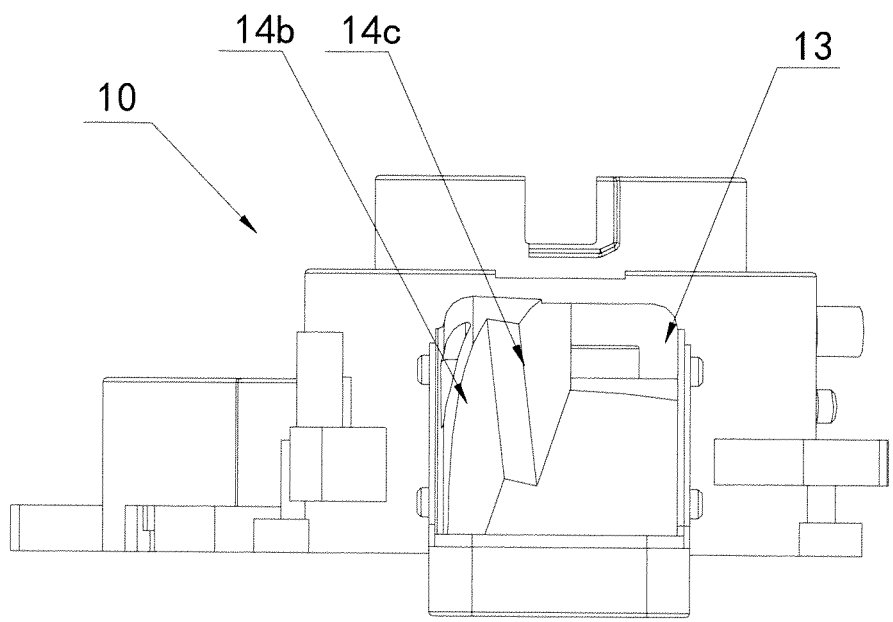
FIG. 4 is a front view of one embodiment of the bean grinding chamber part of the bean grinder of the present invention.
Figure 5:
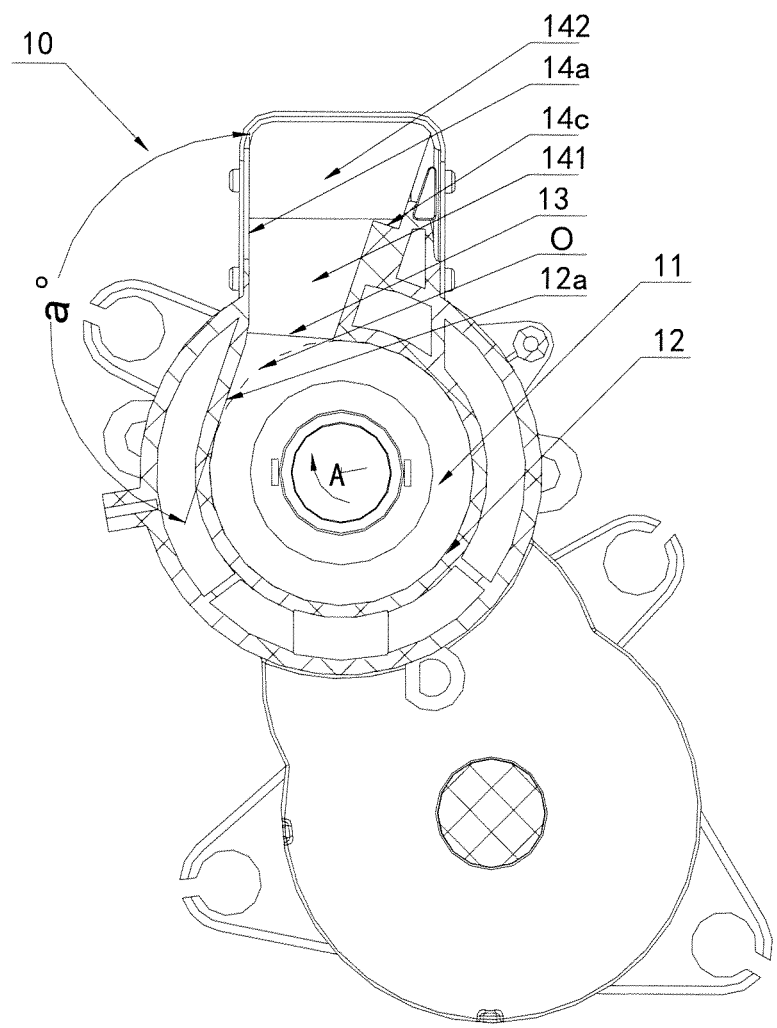
FIG. 5 is a latitudinal cross sectional view of one embodiment of the bean grinding chamber part of the bean grinder of the present invention.

Referring to FIGS. 3 to 5, the bean grinding chamber part 10 comprises a bean grinding chamber 11 and a powder discharge channel 14. The bean grinding chamber 11 is formed of a cylindrical inner wall 12 and a bottom 15. A powder discharge port 13 is defined on the inner wall 12 of the bean grinding chamber. A pivot hole 15a is defined on the bottom 15 of the bean grinding chamber. The powder discharge channel 14 is located at one side of the bean grinding chamber 11. A leading end of the powder discharge channel 14 is in communication with the powder discharge port 13. In order to facilitate the user to deal with abnormal blocking of powder, e.g., the blocking of powder occurred after grinding for times, or the caking of oily coffee powder in the powder discharge channel, and to facilitate the user to observe the powder discharge condition, an opening 14d is defined on the top of the powder discharge channel 14. A powder slot cover 60 can be covered on the opening 14d. An inner surface of the powder slot cover is arc-shaped so as to direct coffee powder to a brewing device.

A rotor shaft 50 is installed in the pivot hole 15a of the bottom 15 of the bean grinding chamber. A dynamic grinding wheel 30 and a residue removing plate 40 are installed, from top to bottom, coaxially to the rotor shaft 50 in the bean grinding chamber 11. The static grinding wheel 20 and the dynamic grinding wheel 30 are incorporated to grind coffee beans, and the static grinding wheel 20 is fixedly installed in the bean grinding chamber 11. A driving device 70, which includes a motor and a gearbox, is provided to rotate the rotor shaft 50.

Referring further to FIG. 5, the inner wall 12 of the bean grinding chamber is provided with a first inner wall 12a. The first inner wall 12a is planar and is disposed close to the powder discharge port 13, and located at a rear side of the powder discharge port 13 in the rotation direction of the dynamic grinding wheel 30 (the direction of arrow A as shown in FIG. 5). The first inner wall 12a is tangent to the cylindrical inner wall 12. The inner wall 12 along a latitudinal direction defines a circle O as shown in FIG. 5, and the first inner wall 12a is tangent to the circle O of the inner wall 12. As such, coffee powder accumulating at the powder discharge port 13 can be reduced and powder discharge can be facilitated. The inner wall of the powder discharge channel 14 comprises a second inner wall 14a located at the same side of the powder discharge port 13 with the first inner wall 12a. The second inner wall 14a is inclined outwards at a given angle α with respect to the first inner wall 12a, where $0°<α<180°$, and more preferably, $10°≤α≤90°$. Since the second inner wall 14a is inclined outwards at a given angle α with respect to the first inner wall 12a, a negative effect on the rotating portion of the bean grinder can be reduced when blocking force is generated by coffee powder accumulating.

In a working state, the rotor shaft 50 is driven by the driving device 70 to rotate the dynamic grinding wheel 30 and the residue removing plate 40. The static grinding wheel 20 is engaged with the dynamic grinding wheel 30 to grind coffee beans into powder. The ground coffee powder is thrown, by the rotating of the residue removing plate 40, out of the bean grinding chamber 11 and into the powder discharge channel 14 along the first inner wall 12a, and then directed to the brewing device of a coffee pot by the powder slot cover provided with the arc-shaped inner surface.

When blocking occurs and the coffee powder needs to be cleaned up, through restarting the bean grinding function after removing coffee powder from a coffee powder collector, the dynamic grinding wheel 30 will be rotated to drive the residue removing plate 40 to rotate thereby throwing the coffee powder with the centrifugal force of rotation out from the bean grinding chamber 11 along the first inner wall 12a in the tangent direction, and in this situation, the pushing force is large. In the meantime, since the second inner wall 14a of the powder discharge channel 14 and the first inner wall 12a of the bean grinding chamber 11 form the given angle, the blocking force of coffee powder accumulated near to the second inner wall 14a is smaller than the centrifugal pushing force generated by the rotation of the residue removing plate 40. The blocking coffee powder can be pushed out by the centrifugal pushing force generated by the rotation of the residue removing plate. As a result, the cleaning problem of blocking coffee powder can be solved by autorotation of the bean grinder.

During the experiment, it is found that if the powder discharge port 13 is enlarged by modifying the inner walls of the bean grinding chamber 11 and the powder discharge channel 14, blocking force will increase due to more coffee powder accumulated in the bean grinding chamber, thus blocking the residue removing plate 40 and hindering the rotation of the grinding wheels. Therefore, in order to further solve the cleaning problem of blocking coffee powder, the width L of the powder discharge port 13 is preferably in a range from about 10 cm to about 20 cm. The experiment shows that such range of width of the powder discharge port 13 can reduce the force of blocking coffee powder effectively.

Further referring to FIG. 5, the powder discharge channel 14 comprises a primary channel 141 adjacent to the powder discharge port 13, and a secondary channel 142 distant from the powder discharge port 13. The width of the primary channel 141 is smaller than that of the secondary channel 142, and a stepped surface 14c is formed between the primary channel 141 and the secondary channel 142. Since the powder discharge channel 14 has a stepped structure, blocking force of coffee powder in the secondary channel 142 is smaller than that in the primary channel 141. As such, the coffee powder blocked in the primary channel 141 can be pushed out by the centrifugal pushing force generated by the rotation of the residue removing plate 40. As a result, the cleaning problem of blocking coffee powder can be solved by autorotation of the bean grinder.

Preferably, the inner wall of the powder discharge channel 14 further comprises a third inner wall 14b opposite to the first inner wall 12a with respect to the powder discharge port 13, and the stepped surface 14c is located at the third inner wall 14b. Preferably, the height of the stepped surface 14c is in a range from about 2 cm to about 10 cm.

In conclusion, according to the bean grinder of the present invention, the second inner wall 14a is inclined outwards at a given angle α with respect to the first inner wall 12a, which results in an increase of pushing force. Further, the size decrease of the powder discharge port 13 and the stepped structure of the powder discharge channel 14 reduces the space of the powder discharge channel 14, which further increases the powder discharge force of the bean grinder accordingly. Thus, the transfer efficiency of coffee powder to the brewing device is improved, the amount of coffee powder remaining in the bean grinding chamber is reduced, and the blocking of the coffee powder in the bean grinding chamber and the powder discharge channel. Furthermore, even if blocking occurs due to coffee powder, the coffee powder accumulated in the bean grinding chamber and the powder discharge channel can be pushed out by the centrifugal force of rotation only by simply restarting the bean grinding function of the bean grinder provided with the improved powder discharge channel, and in this way, the cleaning problem of the blocking coffee powder can be solved.

What described above are several embodiments of the present invention, and they are specific and in details, but not intended to limit the scope of the present invention. It will be understood by those skilled in the prior art that various modifications and improvements can be made without departing from the spirit of the present invention, and these modifications and improvements shall be covered by the present invention.

What is claimed is:

1. A bean grinder, comprising a bean grinding chamber part, a dynamic grinding wheel, a static grinding wheel, and a residue removing plate,
    wherein, said bean grinding chamber part comprises a bean grinding chamber and a powder discharge channel, a powder discharge port is defined on an inner wall of said bean grinding chamber, said powder discharge channel is located at one side of said bean grinding chamber, and a leading end of said powder discharge channel is in connection with said powder discharge port;
    said dynamic grinding wheel and said residue removing plate are installed successively, from top to bottom, to a rotor shaft disposed in the bean grinding chamber;
    said static grinding wheel is fixed in said bean grinding chamber and engaged with said dynamic grinding wheel;
    said inner wall of said bean grinding chamber is provided with a first inner wall that is planar, said first inner wall is disposed close to said powder discharge port and located at a rear side of said powder discharge port in a rotation direction of said dynamic grinding wheel, and said first inner wall is tangent to a circle (O) of said inner wall of said bean grinding chamber; and
    an inner wall of said powder discharge channel comprises a second inner wall located at a same side of said powder discharge port with said first inner wall, and said second inner wall is inclined outwards at a given angle α with respect to said first inner wall, 0°<α<180°,
    wherein said powder discharge channel comprises a primary channel adjacent to said powder discharge port, and a secondary channel distant from said powder discharge port, a width of said primary channel is smaller than a width of said secondary channel, and a stepped surface is formed between said primary channel and said secondary channel, and said inner wall of said powder discharge channel comprises a third inner wall opposite to said second inner wall, and said stepped surface is located at said third inner wall.

2. The bean grinder of claim 1, wherein 10°≤α≤90°.

3. The bean grinder of claim 1, wherein a width (L) of said powder discharge port is 10 cm to 20 cm.

4. The bean grinder of claim 1, wherein said first inner wall and said second inner wall are connected in a manner of circular arc transition.

5. The bean grinder of claim 1, wherein a height of said stepped surface is 2 cm to 10 cm.

6. The bean grinder of claim 1, wherein a top inner wall of said powder discharge channel is arc-shaped.

7. The bean grinder of claim 6, wherein an opening is defined at a top of said powder discharge channel, said opening is provided with a powder slot cover, and an inner surface of said powder slot cover is arc-shaped.

8. An automatic coffee pot comprising a bean grinder, and the bean grinder comprising a bean grinding chamber part, a dynamic grinding wheel, a static grinding wheel, and a residue removing plate,
    wherein, said bean grinding chamber part comprises a bean grinding chamber and a powder discharge channel, a powder discharge port is defined on an inner wall of said bean grinding chamber, said powder discharge channel is located at one side of said bean grinding chamber, and a leading end of said powder discharge channel is in connection with said powder discharge port;
    said dynamic grinding wheel and said residue removing plate are installed successively, from top to bottom, to a rotor shaft disposed in the bean grinding chamber;
    said static grinding wheel is fixed in said bean grinding chamber and engaged with said dynamic grinding wheel;
    said inner wall of said bean grinding chamber is provided with a first inner wall that is planar, said first inner wall is disposed close to said powder discharge port and located at a rear side of said powder discharge port in a rotation direction of said dynamic grinding wheel, and said first inner wall is tangent to a circle (O) of said inner wall of said bean grinding chamber; and an inner wall of said powder discharge channel comprises a second inner wall located at a same side of said powder discharge port with said first inner wall, and said second inner wall is inclined outwards at a given angle $\alpha$ with respect to said first inner wall, $0°<\alpha<180°$, wherein said powder discharge channel comprises a primary channel adjacent to said powder discharge port, and a secondary channel distant from said powder discharge port, a width of said primary channel is smaller than a width of said secondary channel, and a stepped surface is formed between said primary channel and said secondary channel, and said inner wall of said powder discharge channel comprises a third inner wall opposite to said second inner wall, and said stepped surface is located at said third inner wall.

9. The automatic coffee pot of claim 8, wherein $10°\leq\alpha\leq90°$.

10. The automatic coffee pot of claim 8, wherein a width (L) of said powder discharge port is 10 cm to 20 cm.

11. The automatic coffee pot of claim 8, wherein said first inner wall and said second inner wall are connected in a manner of circular arc transition.

12. The automatic coffee pot of claim 8, wherein a height of said stepped surface is 2 cm to 10 cm.

13. The automatic coffee pot of claim 8, wherein a top inner wall of said powder discharge channel is arc-shaped.

14. The automatic coffee pot of claim 13, wherein an opening is defined at a top of said powder discharge channel, said opening is provided with a powder slot cover, and an inner surface of said powder slot cover is arc-shaped.

* * * * *